UNITED STATES PATENT OFFICE.

AARON FUQUA, OF WOODVILLE, KENTUCKY.

IMPROVEMENT IN MEDICAL COMPOUNDS.

Specification forming part of Letters Patent No. 140,408, dated July 1, 1873; application filed May 31, 1873.

*To all whom it may concern:*

Be it known that I, AARON FUQUA, of Woodville, in the county of McCracken and State of Kentucky, have invented a new and useful Improvement in Medical Compound, of which the following is a specification:

The object of this invention is to furnish a remedy for diarrhea and similar diseases of the bowels; and it consists in a compound composed of the ingredients hereinafter named, in about the proportions specified, viz:

Red oak bark, one pound; sweet gum bark, one pound; blackberry root, one pound; cloves, four ounces; pimento, four ounces; cinnamon bark, four ounces; extract of logwood, four drams; refined sugar, three pounds.

The above ingredients are combined in the following manner: The red oak and sweet gum bark, briar root, cloves, pimento, and cinnamon (well bruised) are put into a suitable vessel with about two gallons of water. The mixture is now boiled slowly until about one gallon is left, when it is strained and the logwood and sugar is added, and a gentle heat is applied until all is thoroughly dissolved. Then strain and add three pints of brandy or other spirits to prevent fermentation.

This composition is a specific for diarrhea, cholera morbus, and similar bowel complaints.

Having thus described my invention, I claim as new and desire to secure by Letters Patent—

The medical compound above described, substantially as and for the purposes set forth.

AARON FUQUA.

Witnesses:
R. V. WILLIAMS,
S. L. WILEY.